(12) United States Patent
Poole

(10) Patent No.: US 6,359,613 B1
(45) Date of Patent: Mar. 19, 2002

(54) POINTING STICK HAVING CHIP RESISTORS

(75) Inventor: David L. Poole, Portland, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/168,022

(22) Filed: Oct. 7, 1998

(51) Int. Cl.[7] ............................................. G09G 5/00
(52) U.S. Cl. ...................... 345/161; 345/168; 345/169; 345/160; 345/156; 463/38
(58) Field of Search ................................. 345/161, 168, 345/169, 160, 156; 463/38; 200/5 R

(56) References Cited

U.S. PATENT DOCUMENTS

| | | | | |
|---|---|---|---|---|
| 4,168,404 A | * | 9/1979 | Lockard | 200/1 R |
| 4,680,577 A | | 7/1987 | Straayer et al. | 345/160 |
| 4,826,049 A | * | 5/1989 | Speer | 222/146.5 |
| 4,876,524 A | | 10/1989 | Jenkins | 338/2 |
| 4,931,781 A | * | 6/1990 | Miyakawa | 345/160 |
| 5,407,285 A | | 4/1995 | Franz | 400/490 |
| RE35,016 E | | 8/1995 | Gullman et al. | 73/862.41 |
| 5,473,347 A | | 12/1995 | Collas et al. | 345/169 |
| 5,489,900 A | | 2/1996 | Cali et al. | 341/34 |
| 5,521,596 A | | 5/1996 | Selker et al. | 341/22 |
| 5,555,004 A | * | 9/1996 | Ono et al. | 345/161 |
| 5,640,179 A | * | 6/1997 | Lake | 345/161 |
| 5,659,334 A | | 8/1997 | Yaniger et al. | 345/156 |
| 5,689,285 A | * | 11/1997 | Asher | 345/161 |
| 5,696,535 A | * | 12/1997 | Rutledge et al. | 345/156 |
| 5,738,352 A | * | 4/1998 | Ohkubo et al. | 273/148 B |
| 5,754,167 A | * | 5/1998 | Narusawa et al. | 345/161 |
| 5,786,808 A | * | 7/1998 | Khoury | 345/161 |
| 5,867,808 A | * | 2/1999 | Selker et al. | 702/41 |
| 5,870,082 A | * | 2/1999 | Selker et al. | 345/168 |
| 5,874,938 A | * | 2/1999 | Marten | 345/156 |
| 5,877,749 A | * | 3/1999 | Shiga et al. | 345/168 |
| 5,912,612 A | * | 6/1999 | DeVolpi | 338/95 |
| 6,002,388 A | * | 12/1999 | Seffernick et al. | 345/161 |
| 6,040,823 A | * | 3/2000 | Seffernick et al. | 345/168 |
| 6,128,006 A | * | 10/2000 | Rosenberg et al. | 345/163 |
| 6,195,082 B1 | * | 2/2001 | May et al. | 345/161 |

* cited by examiner

Primary Examiner—Richard Hjerpe
Assistant Examiner—Kevin M. Nguyen
(74) Attorney, Agent, or Firm—Mark Bougeois; Mark Borgman

(57) ABSTRACT

A device for generating conditioned electrical signals in response to forces applied to the device. The device includes a shaft attached to a substrate. Several strain sensitive resistors are mounted on the substrate around the shaft for generating an electrical signal representative of a magnitude and direction of force applied to the shaft by a user. Several apertures are in the substrate, each aperture is located between a pair of strain sensitive resistors. The apertures concentrate the stress on the resistors. A signal conditioning device is mounted to the substrate and is electrically connected to the resistors for conditioning the electrical signal. The signal conditioning device receives the electrical signal in an analog form and provides a conditioned signal as an output in a digital form. The device is mounted to a keyboard base. An alternative embodiment is shown using a cavity instead of apertures in the substrate.

24 Claims, 7 Drawing Sheets

POINTING STICK HAVING CHIP RESISTORS

BACKGROUND OF THE PREFERRED EMBODIMENT(S)

1. Field of the Preferred Embodiment(s)

This invention generally relates to a pointing device for controlling the positioning, movement and operation of an electronic device, for example, a cursor on a display screen. Specifically, the specific embodiment illustrated includes: a shaft, a substrate, resistor based strain gages, a printed circuit board and control electronics mounted on the printed circuit board.

2. Cross Reference to Related and Copending Applications

The following applications are herein incorporated by reference for supportive and related teachings:

U.S. patent application Ser. No. 08/717,517, filed Sep. 23, 1996 is a collar mounted pointing stick and has the same assignee as the present invention.

U.S. patent application Ser. No. 08/756,202, filed Nov. 25, 1996 is a pointing stick with z-axis actuation and has the same assignee as the present invention.

U.S. patent application Ser. No. 08/938,274, filed Sep. 26, 1997 is a unified bodied z-axis pointing stick and has the same assignee as the present invention.

U.S. patent application Ser. No. 08/794,703, filed Feb. 4, 1997 is a z-axis pointing stick with ESD protection and has the same assignee as the present invention.

U.S. patent application Ser. No. 09/082,700 filed May 21, 1998 is a pointing stick having an interposer connecting layer and has the same assignee as the present invention.

DESCRIPTION OF THE RELATED ART

Regarding the example of a pointing device for controlling a cursor, manufacturers of portable laptop computers, recognizing the need for placing the cursor controlling device in a permanent and more convenient location, installed a small stubby, button-like joystick centrally around the keys of the computer keyboard, specifically at the juncture of the "g," "h" and "b" keys of the standard "QWERTY" keyboard. The joystick, also known as a pointing stick, was sensitive to lateral pressure, the amount and direction of which were sensed and input into the computer to cause movement of the cursor, and the speed and direction of cursor movement corresponded to the amount and direction of pressure on the joystick. That manufacturer may also provide two upwardly extending "mouse" or "click" buttons immediately below the space bar. The joystick is connected by a flexible cable to a computer mother board where it connects to several electronic circuit devices that amplify and condition the signal coming form the joystick. The signal from the joystick is a low level analog signal. Electronic devices on the mother board amplify the low level analog signal and convert it to a digital signal.

Despite the advantages of each type of prior art cursor control, none have been easily or economically manufactured. In particular, providing the electrical connections between the resistors and the circuitry on the computer mother board has been complicated and expensive. The flexible cable runs for a length along a keyboard before connecting with the motherboard.

Further, the electrical signal coming from the joystick is a low level analog signal. As the signal travels along the flexible cable it looses some of its amplitude and is skewed due to attenuation of the signal. During travel along the cable, the signal can be corrupted due to coupling from external electromagnetic interference. These problems of routing a low level analog signal along a cable can cause erroneous readings as to the position of the pointing stick. Therefore, there is a current unmet and heretofore long felt need for a pointing stick, which is easily connected and has improved signal integrity.

3. Description of Related Art Examples of patents related to the present invention are as follows, and each patent is herein incorporated by reference for the supporting teachings:

U.S. Pat. No. Re. 35,016, is a three-axis force measurement stylus.

U.S. Pat. No. 5,489,900, is a strain sensitive columnar transducer for a data entry keyboard contains a column upstanding from the keyboard.

U.S. Pat. No. 5,473,347, is a computer pointing device for controlling the positioning, movement and operation of a cursor on the display screen of a computer.

U.S. Pat. No. 5,407,285, is an apparatus for use in a computer keyboard for cursor control is disclosed.

U.S. Pat. No. 5,521,596, is a sensor device placed either underneath a key cap or a key on a keyboard or between two keys on a keyboard so that cursor movement may be carried out from the keyboard itself.

U.S. Pat. No. 4,876,524, is an isometric control device or the like of the type having an elastic beam and strain gauges attached to the surface of the beam characterized by at least a first group of three strain gages each having an operative axis thereof inclined with a single predetermined angle with respect to the main axis of the beam, and the strain gauges disposed at a first predetermined level along the beam.

U.S. Pat. No. 4,680,577, is a multipurpose key switch for controlling cursor movement on a CRT display and for character entry includes a key cap that moves laterally to provide cursor control and that moves vertically for character entry.

U.S. Pat. No. 5,659,334, is a force sensing pointing device.

The foregoing patents reflect the state of the art of which the applicant is aware and are tendered with the view toward discharging applicant's acknowledged duty of candor in disclosing information that may be pertinent in the examination of this application. It is respectfully stipulated, however, that none of these patents teach or render obvious, singly or when considered in combination, applicant's claimed invention.

SUMMARY OF THE PREFERRED EMBODIMENT(S)

It is a feature of the invention to provide a pointing device for controlling the positioning, movement and operation of an electronic device, for example, a cursor on a display screen. Specifically, there is a shaft, a substrate or printed circuit board having apertures, resistor based strain gages, and control electronics mounted on the printed circuit board. The printed circuit board is mounted to a keyboard base.

It is a feature of the invention to provide a device for generating conditioned electrical signals in response to forces applied to the device. The device includes a shaft having a first and second end. A substrate has the first end of the shaft attached. Several strain sensitive resistors are mounted on the substrate around the shaft for generating an electrical signal representative of a magnitude and direction of force applied to the shaft by a user. Several apertures are in the substrate, each aperture is located between a pair of strain sensitive resistors. A signal conditioning means is mounted to the substrate, and electrically connected to the resistors for conditioning the electrical signal. The signal conditioning means operates to receive the electrical signal as an input and provides a conditioned signal as an output.

It is a further feature of the invention to provide a device for generating conditioned electrical signals in response to forces applied thereon, including an actuator, having strain sensitive resistors mounted thereon for generating an electrical signal representative of force applied to the actuator. The resistors each separated by an aperture. A printed circuit board includes the actuator and has signal conditioning means mounted to the printed circuit board and electrically connected to the resistors for receiving the electrical signal, conditioning the electrical signal and outputting the conditioned signal.

It is a further feature of the invention to provide a device for generating electrical signals in response to forces applied thereon by an operator, the device operable to be connected to an external circuit, including a shaft, having a first and second end. A substrate has the first end of the shaft attached. Several strain sensitive resistors are mounted on the substrate. The resistors are disposed radially around the shaft. The strain sensitive resistors are operable to generate an electrical signal representative of a magnitude and direction of force applied to the shaft by a user. Each resistor is separated by an aperture in the substrate. A mounting bracket contains the printed circuit board and is adapted to mounting to a keyboard base.

It is a further feature of the invention to provide a cavity disposed on a second substrate surface and the resistors are disposed on a first substrate surface such that each resistor is partially disposed above the cavity.

It is a further feature of the invention to provide an electronic control device for allowing a user to control the movement or operation of a responsive electronic system including a substrate. A resistor means is mounted to the substrate to generating an analog signal representative of a direction of mechanical force applied thereon by the user. A signal conditioning means is mounted to the substrate, for receiving the analog signal from the resistor means as an input and generate a digital signal as an output. The resistor means includes either a shaft attached to the substrate and several strain sensitive resistors mounted on the substrate, each resistor separated by an aperture, the resistors and the apertures are disposed radially around the shaft or the resistor means includes a cavity disposed on a side of the substrate with a shaft extending through the cavity and attached to the substrate and strain sensitive resistors mounted to another side of the substrate, each resistor being disposed around the shaft and partially over the cavity.

The invention resides not in any one of these features per se, but rather in the particular combination of all of them herein disclosed and claimed and it is distinguished from the prior art in this combination of all of its structures for the functions specified.

There has thus been outlined, rather broadly, the more important features of the invention so that the detailed description thereof that follows may be better understood, and so that the present contribution to the art may be better appreciated. There are, of course, additional features of the invention that will be described hereinafter and which will form the subject matter of the appended claims. Those skilled in the art will appreciate that the preferred embodiment may readily be used as a basis for the designing of other structures, methods and systems for carrying out the several purposes of the present invention. It is important, therefore, that the claims are regarded as including such equivalent constructions since they do not depart from the spirit and scope of the present invention.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings. The description of the invention may contain, for example, such descriptive terms as up, down top, bottom, right or left. These terms are meant to provide a general orientation of the parts of the invention and are not meant to be limiting as to the scope of the invention.

DETAILED DESCRIPTION OF THE PREFERRED EMBODIMENT

Figure 1:
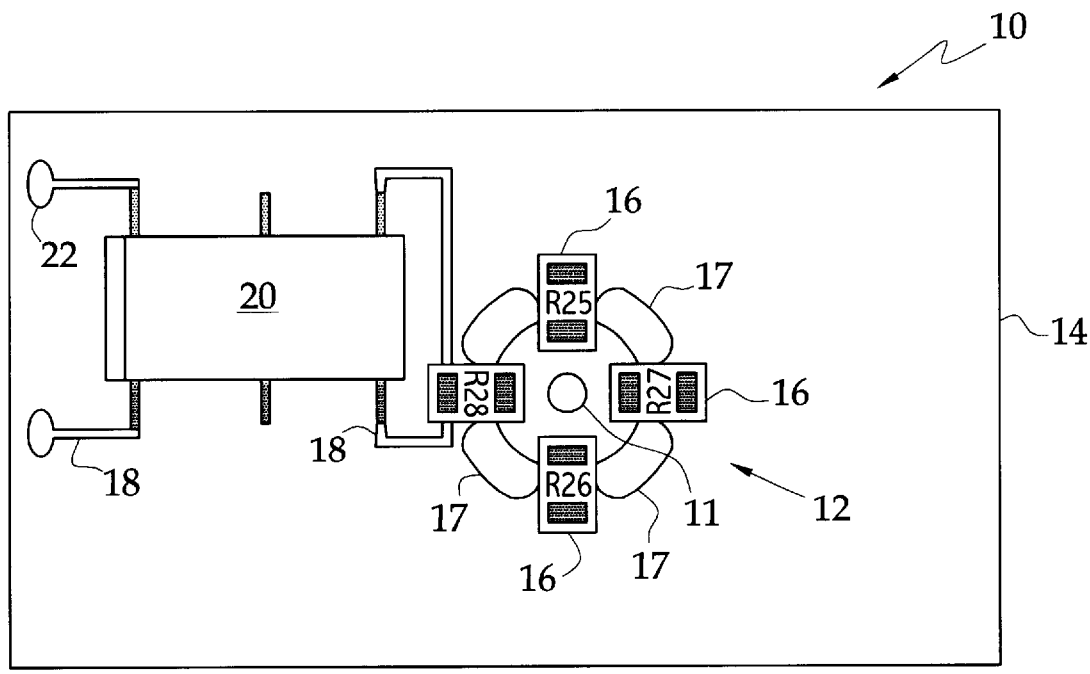
FIG. 1 is a top view of the preferred embodiment of a pointing stick having chip resistors.
Figure 2:
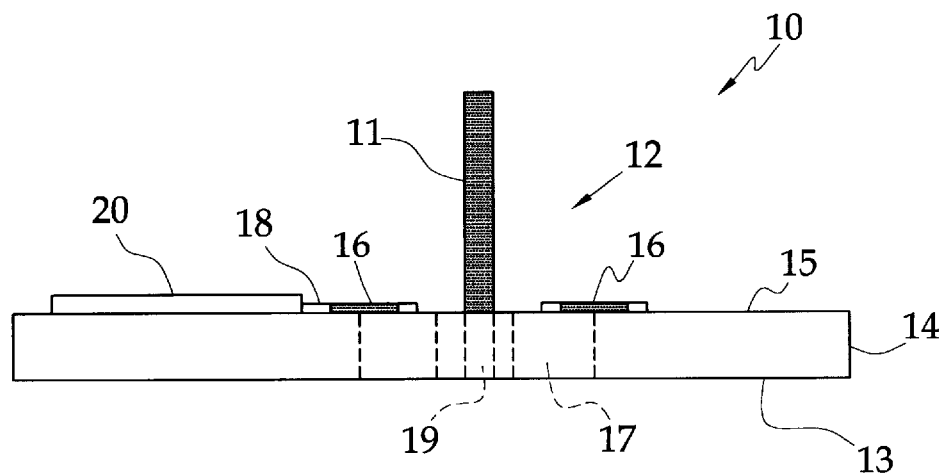
FIG. 2 is a side view of FIG. 1.

Referring to both FIGS. 1 and 2, there is a preferred embodiment of a pointing stick with integral control circuitry assembly 10 that can be used to control the movement of a cursor on a computer screen. In particular, pointing stick assembly 10 has a stick or shaft 11 and a substrate or printed circuit board 14. Stick 11 can be made from ceramic, plastic or metal. Shaft 11 extends through a substrate bore 19. Shaft 11 is held in bore 19 by crimping, heat staking or by using an epoxy. Printed circuit board 14 has a top side 15 and a bottom side 13. Several strain gauge chip resistors 16 are located on top side 15. Resistors 16 could also be located on side 13. Chip resistors 16 are arrayed in a group of four around shaft 11. Between each of the resistors 16 is an aperture 17 which extends through printed circuit board 14. The apertures 17, cause the stress of flexing printed circuit board 14 by shaft 11, to be concentrated onto resistors 16. Electrically conductive circuit lines 18 connect between the resistors and signal conditioning circuit device 20. Shaft 11, circuit board 14, resistors 16 and apertures 17 make up actuator 12. The resistors 16 are typically connected in a bridge configuration by the circuit lines 18.

Printed circuit board or substrate 14 has resistors 16 connected to circuit lines 18 by conventional electronic interconnection techniques such as soldering. Similarly, signal conditioning circuitry 20 is connected to another end of circuit line 18 by another solder joint. Terminals 22 connect with signal processing or conditioning circuit device 20 on printed circuit board 14 via circuit lines 18. Signal processing device 20 is a conventional pointing stick electronic signal processing device known as Trackpoint and is commercially available from Philips Electronics Semiconductor Division. Several terminals 22 are provided to connect from printed circuit board 14 to an external electrical circuit (not shown) such as a computer motherboard.

Figure 8:
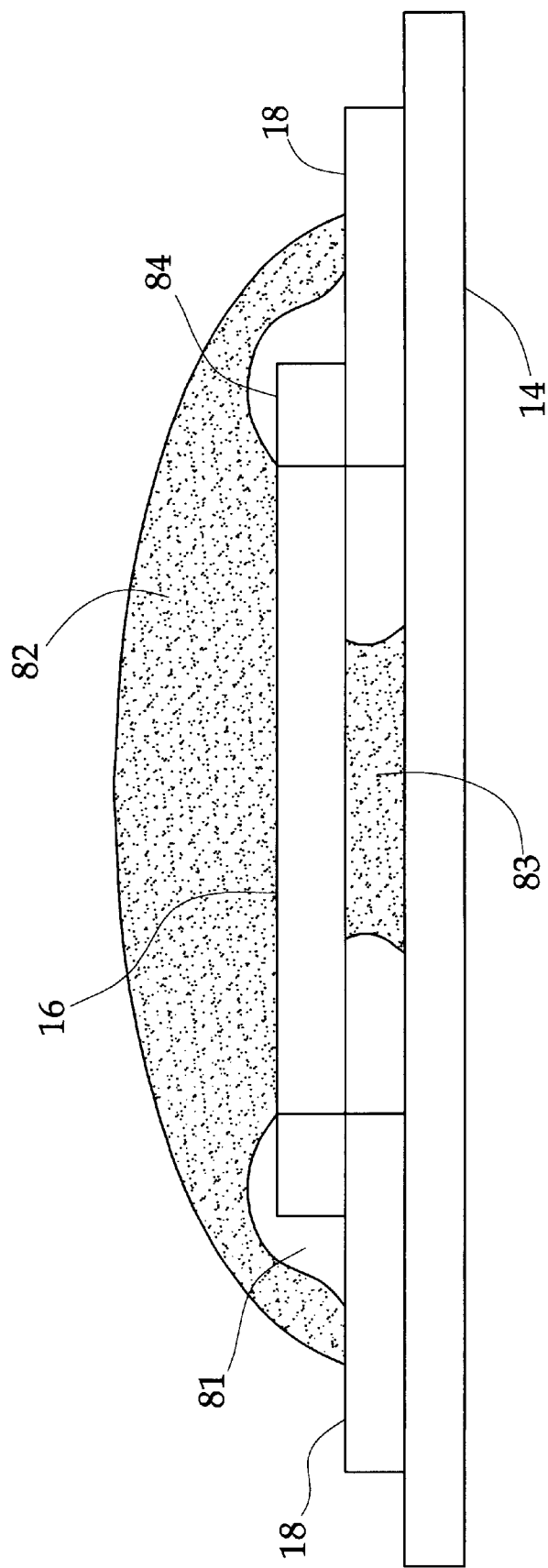
FIG. 8 is a side cross-sectional view of a discrete chip resistor of the pointing stick of FIG. 1.

FIG. 8 shows details of a side cross-sectional view of discrete chip resistor 16 mounted to printed circuit board 14. The resistor 16 has metallic bond pads 84 on each end. The bond pads 84 are electrically and mechanically connected to circuit lines 18 by solder 81. During surface mount processing, a glue 83 is used to hold the resistor 16 to the circuit board 14. The glue 83 also assists in transferring the stress from movement of shaft 11 to the resistors 16. If desired, an encapsulating cover coat 82 can be placed over the resistor 16 to act as a protective sealant. Various cover coats such as epoxy, or silicones can be used.

Pointing stick assembly 10 can be assembled as follows: The first step is to screen solder paste 81 onto lines 18 and dispense glue 83 onto board 14 at the location of the resistors. Next, the resistors 16 and device 20 are placed onto printed circuit board 14 using conventional surface mount pick and place techniques. Next, the board 14 is soldered by passing the board through an IR solder reflow oven. Next, an optional cover coat 82 could be applied. The stick 11 is placed into and fastened to board 14. Finally, assembly 10 is tested.

Figure 3:
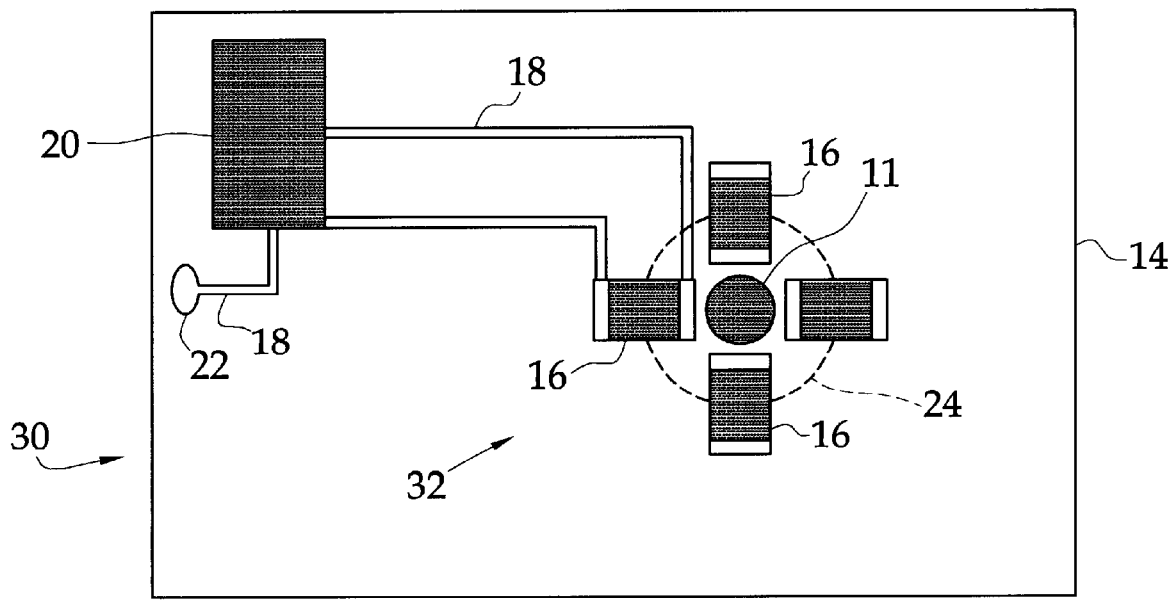
FIG. 3 is a top view of an alternative embodiment of a pointing stick having chip resistors.
Figure 4:
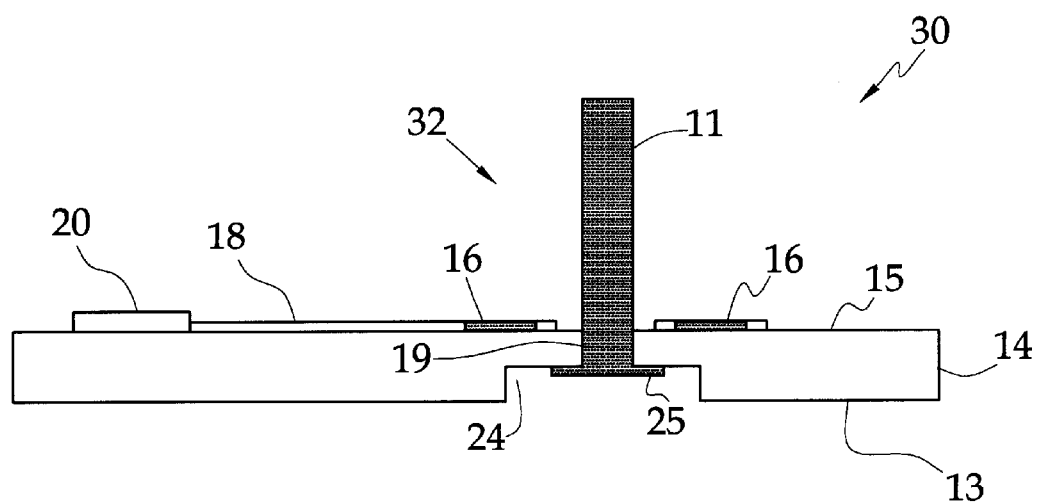
FIG. 4 is a side view of FIG. 3.

Referring to both FIGS. 3 and 4, there is an alternative embodiment of a pointing stick with integral control circuitry assembly 30 that can be used to control the movement of a cursor on a computer screen. In particular, pointing stick assembly 30 has a cylindrical stick or shaft 11 and a planar substrate or printed circuit board 14. Circuit board 14 has a circular shaped cavity 24 located on bottom side 13. Stick 11 can be made from ceramic, plastic or metal. Shaft 11 extends through a substrate bore 19. Shaft 11 has a collar 25 at one end. Shaft 11 is held in bore 19 by crimping, heat staking or by using an epoxy. The printed circuit board 14 has a top side 15 and a bottom side 13. Several strain gauge chip resistors 16 are located on top side 15. The chip resistors 16 are arrayed in a group of four around shaft 11. The chip resistors 16 are strain gage chip resistors. The cavity 24 causes the stress of flexing the printed circuit board 14 by shaft 11 to be concentrated onto resistors 16. Electrically conductive circuit lines 18 connect between the resistors and signal conditioning circuit device 20. Shaft 11, resistors 16 and cavity 24, make up actuator 32. The resistor is mounted to the circuit board, the same as in FIGS. 1 and 2.

Printed circuit board or substrate 14 has resistors 16 connected to circuit lines 18 by conventional electronic interconnection techniques such as soldering. Similarly, signal conditioning circuitry 20 is connected to another end of circuit line 18 by another solder joint. Terminals 22 connect with signal processing or conditioning circuit device 20 on printed circuit board 14 via circuit lines 18. Signal processing device 20 is a conventional pointing stick electronic signal processing device known as Trackpoint and is commercially available from Philips Electronics Semiconductor Division. Several terminals 22 are provided to connect from printed circuit board 14 to an external electrical circuit (not shown) such as a computer motherboard.

Pointing stick assembly 30 would be assembled the same as for assembly 10.

Figure 5:
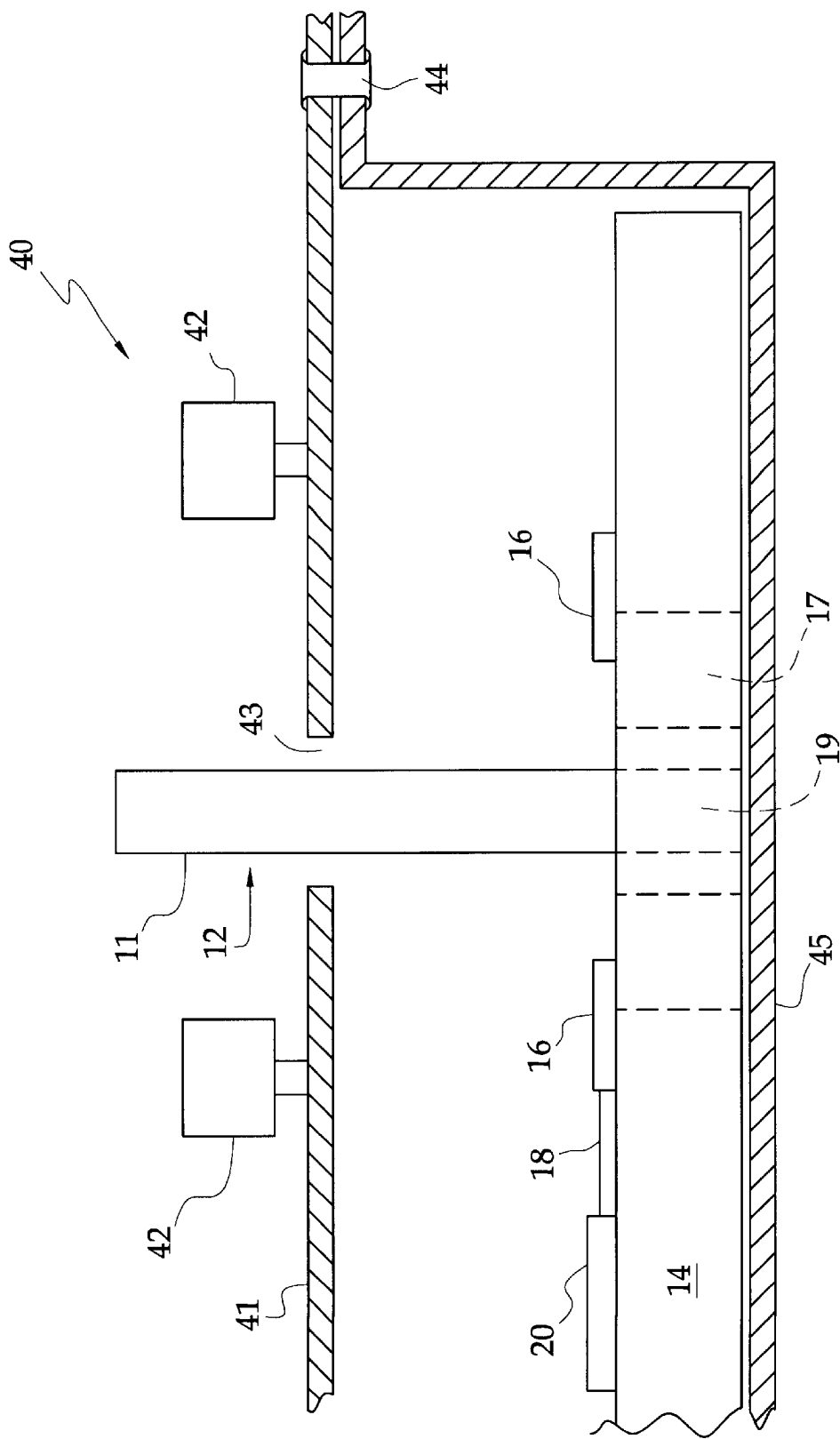
FIG. 5 is a cross-sectional view of the pointing stick of FIG. 1 mounted on a keyboard using a mounting bracket.

FIG. 5 shows a partial cross-sectional view of pointing stick assembly 10 mounted on a keyboard. Keyboard assembly 40 is a representation of a keyboard. Assembly 40 has a keyboard base 41, keys 42, and keyboard aperture 43. Pointing stick 10 is mounted to keyboard 40 with a mounting bracket 45. Shaft 11 extends through keyboard aperture 43 and between keys 42. Mounting bracket 45 is attached to keyboard base 41 by conventional fasteners such as rivet 44. Pointing stick assembly 10 is supported and contained by bracket 45 below the keyboard base 41.

Figure 6:
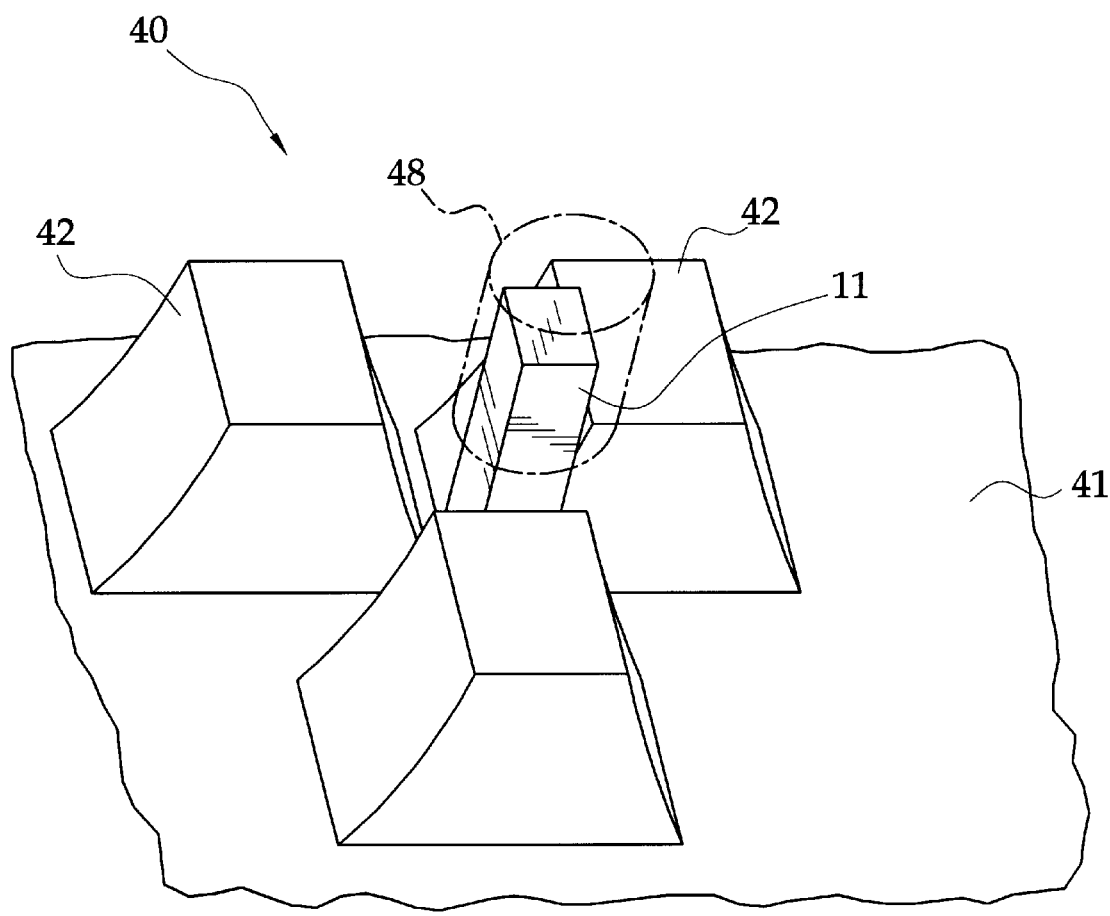
FIG. 6 is a perspective view of a keyboard with the pointing stick.

FIG. 6 shows a keyboard base 41 with the shaft 11 extending upwardly between keys 42. A rubber cap 48 is shown in phantom. The cap 48 may or may not be placed over shaft 11 to improve the ergonomics or feel for the user.

Figure 7:
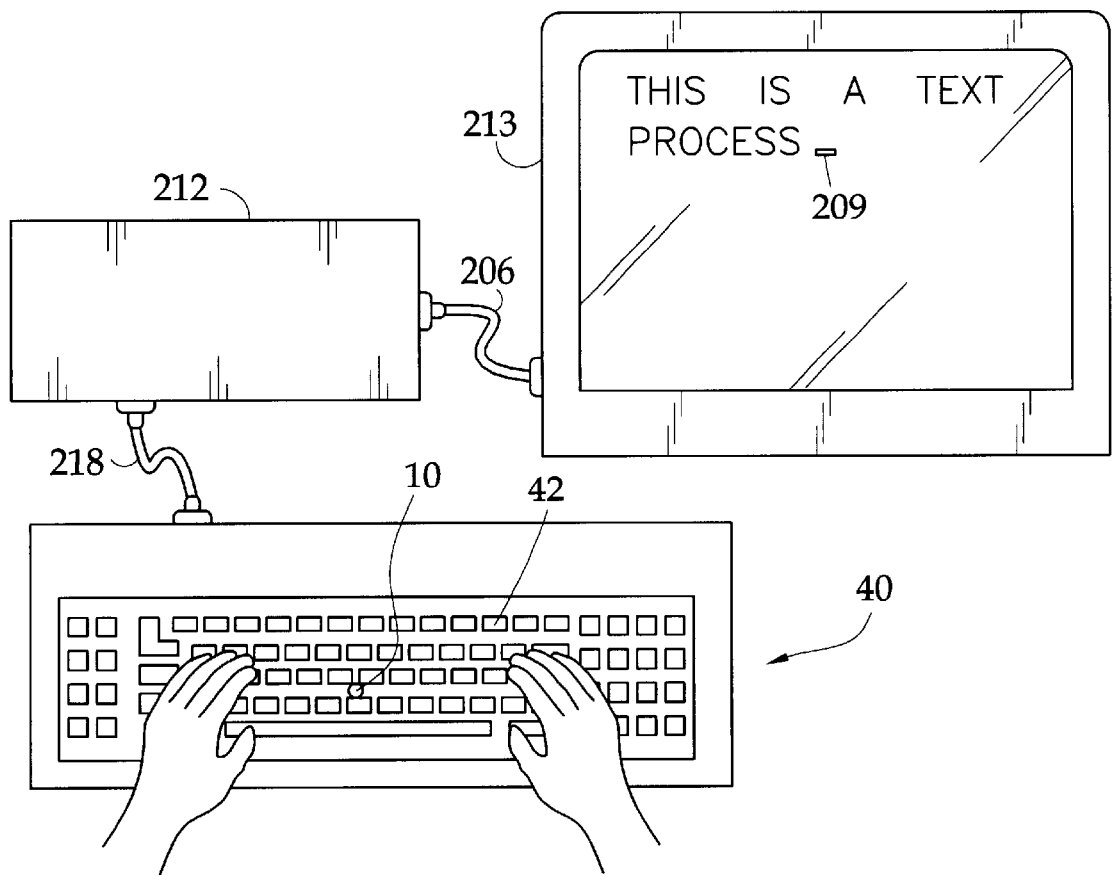
FIG. 7 is a view of a computer system and the pointing stick mounted on a keyboard.

FIG. 7 shows a computer system and a keyboard assembly 40 with pointing stick assembly 10. Pointing stick 10 is located between keys 42. Keyboard 40 is electrically connected to computer 212 by cable 218. Computer 206 is electrically connected to monitor 213 by cable 206. Monitor 213 has a cursor 209 on the screen. Pointing stick assembly 10 allows a user to control the position of cursor 209 on monitor 213.

When a user moves shaft 11, in an X or Y direction, forces exerted on the shaft are translated to substrate 14 and to resistors 16 causing the resistors to change their resistance value. Signal conditioning device 20 supplies a low level voltage through resistors 16. The change in resistance value is received by signal conditioning device 20 as an analog signal. The signal conditioning device 20 changes the analog signal into a digital signal to be outputted on terminals 22 to another electrical circuit (not shown). When a user moves shaft 11, in the Z axis direction (along the axis of the length of the shaft), forces exerted on the shaft are translated to substrate 14 and to resistors 16 causing the all the resistors to change their resistance value and to lower the overall resistance of the resistors when they are connected in a bridge configuration.

It is understood that printed circuit board 14 contains other electronic components necessary for signal conditioning which are mounted using conventional surface mount techniques. The assembly 10 is placed into bracket 45 and shaft 11 is inserted through keyboard base bore 43. Keyboard assembly 40 is completed by attaching bracket 45 to keyboard base 41 by fasteners 44.

Figure 9:
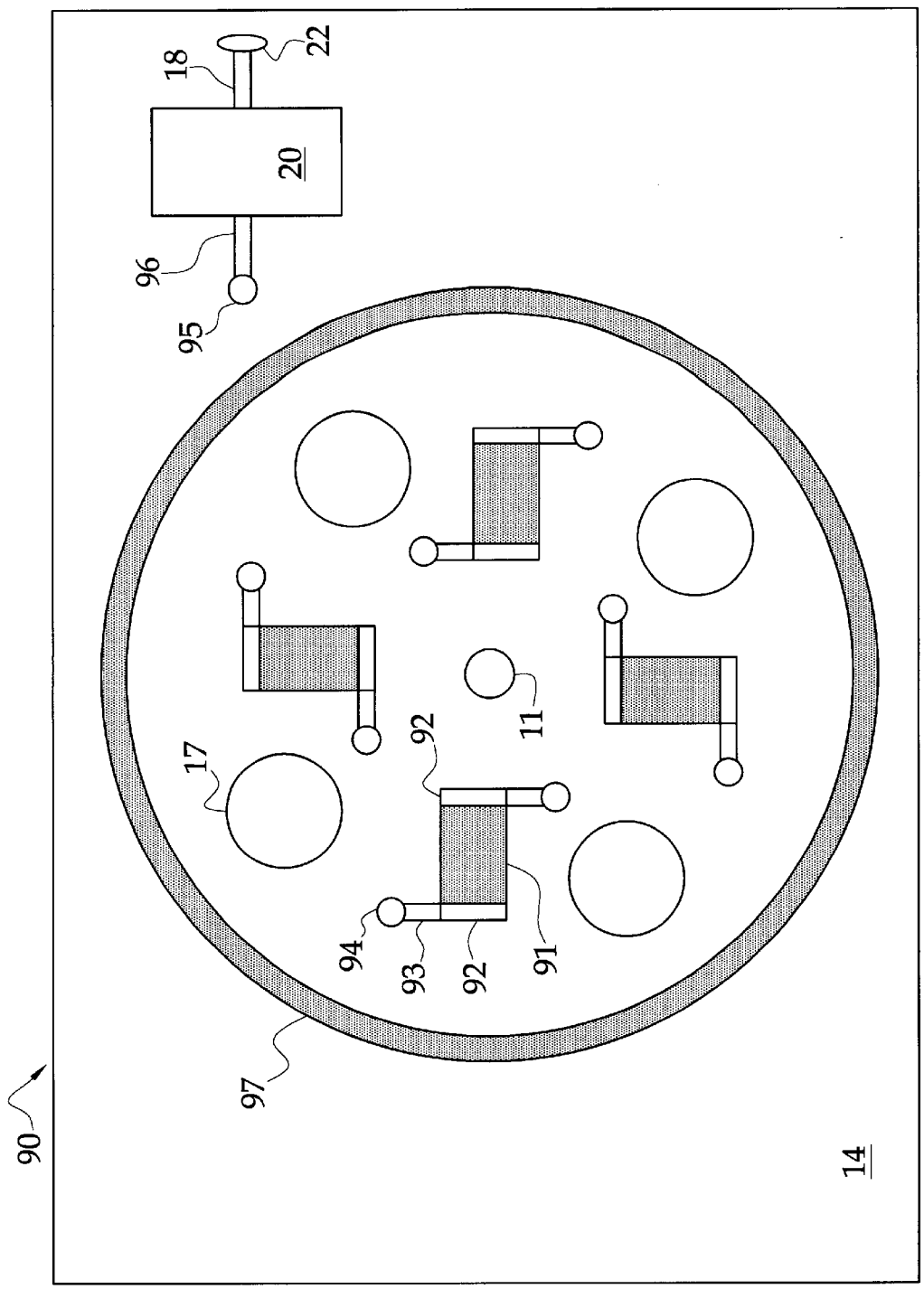
FIG. 9 is a top view of an alternative embodiment of a pointing stick having screen printed polymer resistors.

FIG. 9 shows an alternative embodiment of a pointing stick assembly 90 having screen printed polymer resistors. A stick or shaft 11 is shown mounted in a substrate or printed circuit board 14. The screen printed polymer resistors 91 are applied using conventional screen printing techniques to circuit board 14. A conductor 92 is connected on each side of resistor 91 and connects to a via connection line 93. The via connection line 93 is connected to a via 94 which passes through circuit board 14 and electrically connects various layers in the circuit board which contain various wiring geometries. Resistors 91 are arrayed in a group of four around shaft 11. Between each of the resistors 91 is an aperture 17 which extends through printed circuit board 14. The apertures 17, cause the stress of flexing printed circuit board 14 by shaft 11, to be concentrated onto resistors 91. The vias 94 electrically connect by a circuit line (not shown) with the vias 95 which connect to circuit line 96 which is connected to signal conditioning circuit device 20. Electrically conductive circuit lines 18 connect between signal conditioning circuit device 20 and terminal 22. Again, Signal processing device 20 is a conventional pointing stick electronic signal processing device known as Trackpoint and is commercially available from Philips Electronics Semiconductor Division. Terminals 22 are provided to connect from printed circuit board 14 to an external electrical circuit (not shown) such as a computer motherboard.

Referring now to FIGS. 5, 6, 7 and 9, during the operation of keyboard 40, the motion of actuating the keys may cause undesirable vibrations or forces to be translated from keyboard 40 to device 90 which can result in a drifting cursor 209 on the display screen 213. These undesirable forces are called Seffernick forces. Seffernick forces are those forces that are applied to a supporting structure, a keyboard for example, that are translated to the pointing stick. For example, typing on a keyboard can generate seffernick forces. In that case, the pointing stick is so sensitive that a user would be activating the pointing stick operation unintentionally. The sensitive electronics on the pointing stick would sense the deformation of the keyboard support surfaces and translate that into deformation of its own support surface and mistakenly generate control signals. Thus, seffernick forces are those forces that are translated from a support structure through the body of the pointing stick and to the electronic components of the pointing stick sufficient to generate unintentional control signals.

In order to reduce these Seffernick forces, it has been found useful to surround the resistors 91 and shaft 11 with a rigid member or isolator 97 so that the resistor area is somewhat insulated from vibrations. A metal or ceramic ring 97 is shown encircling the resistors 91 and shaft 11. The vias 94 are required in order to route electrical signals outside the inner circle of ring 97. The ring 97 could also be used in the embodiments shown in FIGS. 1 and 3 with discrete chip resistors.

VARIATIONS OF THE PREFERRED EMBODIMENT(S)

One of ordinary skill in the art of making pointing sticks or other electronic controls such as remote controls, will realize that there are many different ways of accomplishing the preferred embodiment. For example, although shaft 11 and circuit board 14 were shown as separate pieces, they could be one piece.

It is further possible to have printed circuitry board 14 be another material such as a ceramic or a flexible film. Even though only one layer of circuit lines 18 are shown, it is possible to have a multilayer circuit board, for a more compact design. It is further possible to have additional signal processing devices 20 mounted on circuit board 14 to add more circuit functions.

Keyboard 40 is a representation of a keyboard and can be most any multi-layered keyboard design.

Even though, the specification has shown the pointing stick assembly 10 disposed below keyboard base 41, with shaft 11 extending upwardly, it is considered equivalent to have pointing stick assembly 10 disposed on the top of the keyboard base 41 and positioned below the keys 42. Further, assembly 10 could be placed in a cutout region in base 41.

The specification has shown the pointing stick assembly 10 mounted to a keyboard base 41, it is contemplated, however, to mount the pointing stick assembly to other types of bases or structures like remote control devices or joysticks.

Another variation of the preferred embodiment is to use other types of fasteners to hold the control assembly 10 to the keyboard besides rivet 44 such as glue, pressfitting, a retainer with holding tabs or a separate bracket.

The circuit lines 18 could be located on the bottom surface 13. Vias or plated thru holes could be used to electrically connect circuit lines 18 to the top surface 15.

Shaft 11 has been shown as cylindrical. However, it is contemplated that other shaped shafts could be used such as hexagonal or octagonal or square.

Even though, the specification has shown the apertures 17 located between resistors 16. It is contemplated to have the apertures 17 extend under resistors 16 partially or completely to enhance stress concentration. It is contemplated to have the apertures 17 shaped in other shapes than that shown, such as U shaped, or circular or square or rectangular. It is further contemplated that apertures 17 may be omitted.

Even though the specification has shown the metal ring 97 on the top of substrate 14, it is considered equivalent to mount ring 97 on the bottom.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A device for generating electrical signals responsive to a users actuation thereof, comprising:

a) a shaft, having a first and second end;

b) a substrate having the first end of the shaft attached thereto;

c) a plurality of discrete strain sensitive resistors, mounted on the substrate around the shaft, for generating an electrical signal representative of a magnitude and direction of force applied to the shaft by a user;

d) a plurality of apertures in the substrate, each aperture located between a pair of the strain sensitive resistors; and e) signal conditioning means, mounted to the substrate, and electrically connected to the resistors for conditioning the electrical signal, the signal conditioning means operable to receive the electrical signal as an input and provide a conditioned signal as an output.

2. The device according to claim 1, wherein at least one circuit line is disposed on the substrate and electrically connects the signal conditioning means to the resistors.

3. The device according to claim 1, wherein the substrate has a bore passing therethrough, the first end of the shaft being mounted in the substrate bore.

4. The device according to claim 1, wherein the device is attached to a mounting bracket that is adapted for connection with a keyboard base.

5. The device according to claim 1, wherein the keyboard base has an aperture and the second end of the shaft extends through the keyboard aperture.

6. The device according to claim 1, wherein the device outputs the conditioned signal on a plurality of terminals mounted on the substrate.

7. The device according to claim 1, wherein the resistors are electrically connected to the substrate by solder.

8. A device for generating electrical signals in response to forces applied thereon by an operator, the device operable to be connected to an external circuit, comprising:

a) a shaft, having a first and second end;

b) a substrate having the first end of the shaft attached thereto, the substrate having a plurality of apertures extending therethrough; and c) a plurality of surface mountable discrete strain sensitive resistors mounted on the substrate, the resistors disposed radially around the shaft, the strain sensitive resistors operable to generate an electrical signal representative of a magnitude and direction of force applied to the shaft by a user, each resistor being separated by one of said aperture, the apertures concentrating the applied forces from the shaft onto the resistors.

9. The device according to claim 8, further including:

a) signal conditioning means, mounted to the substrate, and electrically connected to the resistors for conditioning the electrical signal, the signal conditioning means operable to receive the electrical signal as an input and provide a conditioned signal as an output.

10. The device according to claim 9, wherein the substrate is a printed circuit board.

11. The device according to claim 10, wherein at least one circuit line is disposed on the printed circuit board and electrically connects the signal conditioning means to the resistors.

12. The device according to claim 10, wherein a plurality of terminals are attached to the printed circuit board and are connectable to the external circuit, the terminals electrically connected to the signal conditioning means.

13. The device according to claim 10, wherein a mounting bracket contains the printed circuit board and is adapted for mounting to a keyboard base.

14. The device according to claim 12, wherein the keyboard base has an aperture and the second end of the shaft extends through the keyboard aperture.

15. The device according to claim 8, wherein the substrate has a cavity disposed on a second substrate surface and the resistors are disposed on a first substrate surface such that each resistor is partially disposed above the cavity.

16. The device according to claim 15, further including:

a) signal conditioning means, mounted to the substrate, and electrically connected to the resistors for conditioning the electrical signal, the signal conditioning means operable to receive the electrical signal as an input and provide a conditioned signal as an output.

17. The device according to claim 16, wherein the substrate is a printed circuit board.

18. The device according to claim 17, wherein at least one circuit line is disposed on the printed circuit board and electrically connects the signal conditioning means to the resistors.

19. The device according to claim 17, wherein a plurality of terminals are attached to the printed circuit board and are connectable to the external circuit, the terminals electrically connected to the signal conditioning means.

20. The device according to claim 17, wherein a mounting bracket contains the printed circuit board and is adapted for mounting to a keyboard base.

21. The device according to claim 20, wherein the keyboard base has an aperture and the second end of the shaft extends through the keyboard aperture.

22. An electronic control device for allowing a user to control the movement or operation of a responsive electronic system, comprising:

a) a substrate;
b) a shaft attached to the substrate;
c) a cavity disposed on a second side of the substrate;
d) a plurality of strain sensitive resistors mounted to a first side of the substrate, each resistor disposed around the shaft and partially over the cavity, the resistors generating an analog signal representative of a direction of mechanical force applied thereon by a user; and
e) a signal conditioning circuit, mounted to the substrate, for receiving the analog signal from the resistor means as an input and generating a digital-signal as an output.

23. The device according to claim 22, wherein the resistors are polymer strain sensitive resistors screened onto the substrate.

24. The device according to claim 22, wherein the resistors are surrounded by a rigid member in order to isolate the resistors from Seffernick forces.

\* \* \* \* \*